United States Patent
Mukherjee et al.

(10) Patent No.: US 11,804,214 B2
(45) Date of Patent: Oct. 31, 2023

(54) METHODS AND APPARATUSES FOR DISCRIMINATIVE PRE-TRAINING FOR LOW RESOURCE TITLE COMPRESSION

(71) Applicant: Walmart Apollo, LLC, Bentonville, AR (US)

(72) Inventors: Snehasish Mukherjee, Santa Clara, CA (US); Phani Ram Sayapaneni, Sunnyvale, CA (US); Shankara Bhargava, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 155 days.

(21) Appl. No.: 17/187,248

(22) Filed: Feb. 26, 2021

(65) Prior Publication Data
US 2022/0277735 A1    Sep. 1, 2022

(51) Int. Cl.
| | | |
|---|---|---|
| G10L 15/16 | (2006.01) | |
| G10L 15/06 | (2013.01) | |
| G10L 15/22 | (2006.01) | |
| G10L 19/04 | (2013.01) | |
| G10L 15/197 | (2013.01) | |

(52) U.S. Cl.
CPC .......... *G10L 15/16* (2013.01); *G10L 15/063* (2013.01); *G10L 15/197* (2013.01); *G10L 15/22* (2013.01); *G10L 19/04* (2013.01); *G10L 2015/0633* (2013.01); *G10L 2015/223* (2013.01)

(58) Field of Classification Search
CPC ..... G10L 15/16; G10L 15/063; G10L 15/197; G10L 15/22; G10L 19/04; G10L 2015/0633; G10L 2015/223
See application file for complete search history.

(56) References Cited

U.S. PATENT DOCUMENTS

| | | |
|---|---|---|
| 7,346,507 B1 | 3/2008 | Natarajan et al. |
| 9,792,275 B2 | 10/2017 | Panemangalore et al. |
| 11,222,621 B2 * | 1/2022 | Battenberg ............. G06N 3/088 |
| 2020/0050667 A1 * | 2/2020 | Lin .......................... G06F 16/35 |
| 2021/0049324 A1 * | 2/2021 | Delcroix ............. G06N 3/0445 |
| 2021/0392106 A1 * | 12/2021 | Rajeev .................. H04L 51/046 |
| 2022/0051479 A1 * | 2/2022 | Agarwal ................. G10L 15/22 |

(Continued)

OTHER PUBLICATIONS

Gong et al., "Automatic Generation of Chinese Short Product Titles for Mobile Display" Proceedings of the AAAI Conference on Artificial Intelligence. vol. 33. No. 01. 2019. (Year: 2019).*

(Continued)

*Primary Examiner* — Bhavesh M Mehta
*Assistant Examiner* — Edward Tracy, Jr.
(74) *Attorney, Agent, or Firm* — Morgan, Lewis & Bockius LLP; Manita Rawat

(57) ABSTRACT

A system for generating compressed product titles that can be used in conversational transactions includes a computing device configured to obtain product title data characterizing descriptive product titles of products available on an ecommerce marketplace and to determine compressed product titles based on the product title data using a machine learning model that is pre-trained using a replaced-token detection task. The computing device also stores the compressed product titles for use during conversational transactions.

20 Claims, 9 Drawing Sheets

(56) References Cited

U.S. PATENT DOCUMENTS

2022/0189456 A1\* 6/2022 Pang .................... G10L 21/007

OTHER PUBLICATIONS

Liu et al., "Self-supervised Learning: Generative or Contrastive" arXiv preprint arXiv:2006.08218 (2020). (Year: 2020).\*
Parrish, Stacy, "Amazon Alexa: Optimizing Titles for Voice," found at: https://content26.com/blog/author/stacy-parrish/, Dec. 20, 2017, 10 pages.
Mukerjee, Snhasish et al., "Automatic Voice Title Generation by Extractive Summarization of Long Product Titles using Bi-LSTM," CS230: Deep Learning, Stanford University, CA 2018, 8 pages.
De Souza, Jose G. C., et al., "Generating E-Commerce Product Titles and Predicting their Quality," Proceedings of the 11th International Natural Language Generation Conference, Tilburg, The Netherlands, Nov. 5-8, 2018, pp. 233-243.
Mane, Mansi Ranjit et al., "Product Title Generation for Conversational Systems using BERT," arXiv:2007.11768v1, Walmart Labs, Sunnyvale, CA, Jul. 23, 2020, 10 pages.

\* cited by examiner

METHODS AND APPARATUSES FOR DISCRIMINATIVE PRE-TRAINING FOR LOW RESOURCE TITLE COMPRESSION

TECHNICAL FIELD

The disclosure relates generally to methods and apparatuses for discriminative pre-training for low resource title compression. More particularly, the disclosure relates to methods and apparatuses for discriminative pre-training for low resource title compression in the context of conversational interactions in ecommerce marketplaces.

BACKGROUND

Many ecommerce marketplaces allow users to interact with the marketplace using voice commands. Such voice commands can be made using various computing devices such as smart phones, voice assistants, tablets, laptops, desktop computers, kiosks, telephones, and other personal computing devices. The voice commands can allow users to shop on the ecommerce marketplace using a conversational interaction with a computing device. Interactions with existing systems that use existing methods and existing apparatuses can be cumbersome and resource intensive. Users can be dissatisfied with verbal interactions with existing ecommerce marketplaces.

For example, existing systems often use a database or other stored repository of product titles in order to verbally interact with a user. The repository of product titles can include a lengthy description of each product. Existing systems often repeat this entire lengthy product title when verbally interacting with a user. Such repeated use of the entire product title during an interaction with a user can be time consuming and have a negative effect of the user's satisfaction with the ecommerce marketplace. As a result, the operator of the ecommerce marketplace can experience decreased sales, increased customer drop-off, decreased customer satisfaction and other undesirable effects. There exists a need, therefore, for improved methods and apparatuses that can compress lengthy product titles into compressed titles that are more suitable for conversational transaction systems for ecommerce marketplaces.

SUMMARY

The embodiments described herein are directed to methods and apparatuses for compressing lengthy or descriptive product titles into compressed product titles for use in conversational transaction systems for ecommerce marketplaces. The embodiments described herein can be implemented using one or more computing devices that can include operative elements that can determine compressed product titles using pre-trained machine learning models that are pre-trained using a replaced-token detection task. The machine learning models can also include multiple layers of a neural network that includes an embedding layer that utilized word-level and character-level embeddings. The methods and apparatuses of the present disclosure deliver improved or equal results to existing systems that require significantly more resources or are more costly to implement.

In accordance with various embodiments, exemplary systems may be implemented in any suitable hardware or hardware and software, such as in any suitable computing device. For example, in some embodiments, an system for determining compressed product titles includes a computing device configured that can be configured to obtain product title data characterizing descriptive product titles of products available on an ecommerce marketplace. The computing device can also determine compressed product titles based on the product title data using a machine learning model that is pre-trained using a replaced-token detection task. The computing device can then store the compressed product titles for later use.

In one aspect, the machine learning model can be fine-tuned using a subset of the product title data and corresponding human-generated compressed product titles.

In another aspect, the machine learning model can include an embedding layer, an encoder layer and a classification layer.

In another aspect, the machine learning model can be trained using a training dataset comprising first vectors containing indices of words in a product title and second vectors comprising indices of characters in each word of the product title.

In another aspect, a skip gram model can be used to determine replacement tokens for use in the replaced-token detection task.

In another aspect, the machine learning model can include a character-level convolutional neural network layer, a bidirectional long short-term memory layer and a self attention layer.

In another aspect, the machine learning model can be trained on a single graphics processing unit (GPU) in less than one hour.

In other embodiments provided in accordance with the present disclosure, methods of determining compressed product titles are provided. In one example, a method can include obtaining product title data characterizing descriptive product titles of products available on an ecommerce marketplace and determining compressed product titles based on the product title data using a machine learning model, wherein the machine learning model is pre-trained using a replaced-token detection task. The method can further include storing the compressed product titles.

In still other examples in accordance with the present disclosure, non-transitory computer readable mediums are provided. The example non-transitory computer readable mediums can have instructions stored thereon, wherein the instructions, when executed by at least one processor, cause a device to perform operations that include obtaining product title data characterizing descriptive product titles of products available on an ecommerce marketplace and determining compressed product titles based on the product title data using a machine learning model, wherein the machine learning model is pre-trained using a replaced-token detection task. The operations can also include storing the compressed product titles.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
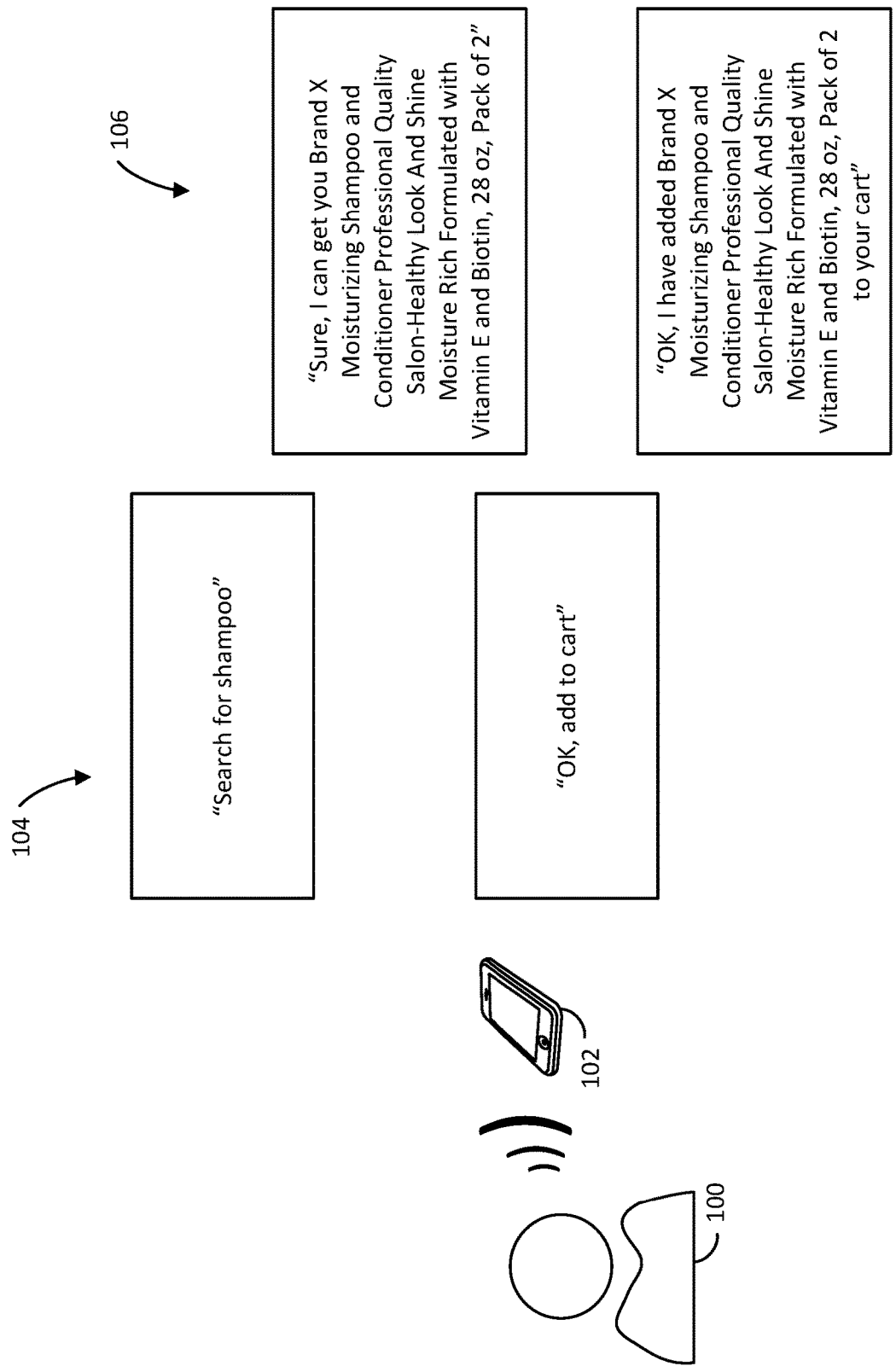
FIG. 1 is an illustration showing an example conversational transaction between a user a conversational transaction system.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The use of voice assistants on home computing devices and on personal computing devices such as smart phones, tablets, laptops and the like has become more commonplace and has found increasing acceptance and use by consumers. This, in turn, has increased the usage of conversational transactions on ecommerce marketplaces. Users of such ecommerce marketplaces have increasingly sought to perform transactions and other actions on ecommerce marketplaces using voice commands. The ecommerce marketplaces can often have a tool that can facilitate the use of voice commands to execute transactions and other actions on the ecommerce marketplace. Conversational shopping or other conversational transactions can have problems that can lead to decreased customer satisfaction or can lead to customer frustration. When customers are dissatisfied with the conversational interactions with the ecommerce marketplace, this can lead to decreased transactions, decreased revenues, and increased costs because a customer may choose other more costly methods of executing the transaction and can lead to customers dropping from the website, mobile application or other service.

The methods and apparatuses of the present disclosure can be used to improve a user's experience with conversational transactions on an ecommerce marketplace. One problem with existing conversational tools on ecommerce marketplaces is the generation of compressed or shortened titles that the conversational tool will use when interacting with a user. Product titles that can exist in the catalog of items available on an ecommerce marketplace often include a lengthy title. While the lengthy title can include detailed information regarding the product, the entire title does not lend itself to conversational transactions because the lengthy title takes an unsatisfactory length of time to repeat during a conversation and can lead to increased times for a user to execute a simple transaction.

An example is shown in FIG. 1. In FIG. 1, a user 100 is conversationally interacting with a smartphone 102 to perform a simple conversational shopping transaction. In this example, the user is purchasing shampoo on an ecommerce marketplace. The user 100 can be interacting, for example, with a mobile application or website on the smartphone 102. In this example, the user 100 can make the conversational commands 104 and the conversational transaction tool provided by the ecommerce marketplace can make the conversational statements 106. In this example, the user 100 asks to "search for shampoo." In response, the conversational tool can respond with "sure, I can get you Brand X Moisturizing Shampoo and Conditioner Professional Quality Salon-Healthy Look And Shine Moisture Rich Formulated with Vitamin E and Biotin, 18 ounces, Pack of 2." This response by the conversational tool has accessed a product catalog and repeated the product title that may be included in the product catalog. As can be seen, this product title is extremely long and likely includes information that the user 100 does not need and does not want the conversational tool to repeat in the response.

The exchange shown in FIG. 1 further shows that the user 100 can respond with "OK, add to cart." In response, the conversational tool again uses the full product title to respond with "OK, I have added Brand X Moisturizing Shampoo and Conditioner Professional Quality Salon-Healthy Look And Shine Moisture Rich Formulated with Vitamin E and Biotin, 18 ounces, Pack of 2 to your cart." Again, the user 100 likely does not need the entire title to be repeated. The user 100 can become frustrated if each time the product is recited by the conversational tool, the entire lengthy title is repeated.

To address the issue presented above, operators of ecommerce marketplaces can prepare compressed or shortened product titles that can be used to replace the lengthy title. In the example above, the lengthy title could be replaced with the compressed title "Shampoo and Conditioner." In other examples, other compressed titles could be used.

Existing methods and apparatuses that can be used to prepare compressed titles are costly, burdensome and can require significant resources to complete. For example, one existing method requires that the lengthy full product titles to be given to human actors that can create compressed titles individually. Such a process using human actors, however, can be very costly and time-consuming to complete. Consider a large retailer that can have over two hundred million products available for purchase on an ecommerce marketplace. Such a task would be very costly. In addition, it is unreasonable to use such a process when the catalog of items available on some ecommerce marketplaces changes daily or hourly as new products become available on other items are discontinued.

Other existing methods and apparatuses can attempt to automate the creation of compressed product titles. Existing methods and apparatuses, however, are very resource intensive. Some existing methods and apparatuses can, for example, include machine learning models that can prepare compressed product titles. Such existing models, however, use a significant amount of parameters in order to accurately prepare such compressed product titles. For example, one such existing model uses around 110 million parameters to prepare product titles. Such a model requires dedicated computing devices and a significant length of time to create the compressed product titles. Existing methods and apparatuses are expensive and resource-intensive to implement. Existing methods and apparatuses cannot be deployed in many settings due to resource requirements for such models.

The methods and the apparatuses of the present disclosure address these problems. The methods and apparatuses of the present disclosure provide low resource, inexpensive alternatives to automatically prepare high quality compressed product titles. The method and apparatuses of the present disclosure can prepare compressed product titles that have similar accuracy to existing methods and apparatuses while only consuming a tiny fraction of the parameters of existing methods. In one example further described below, a method and apparatus of the present disclosure consumes only 2 million parameters to achieve a similarly accurate results to existing methods that consume 110 million parameters. Such a reduction is a significant improvement over existing methods to make implementation less costly and available for more widespread implementation without sacrificing accuracy in the results.

Figure 2:
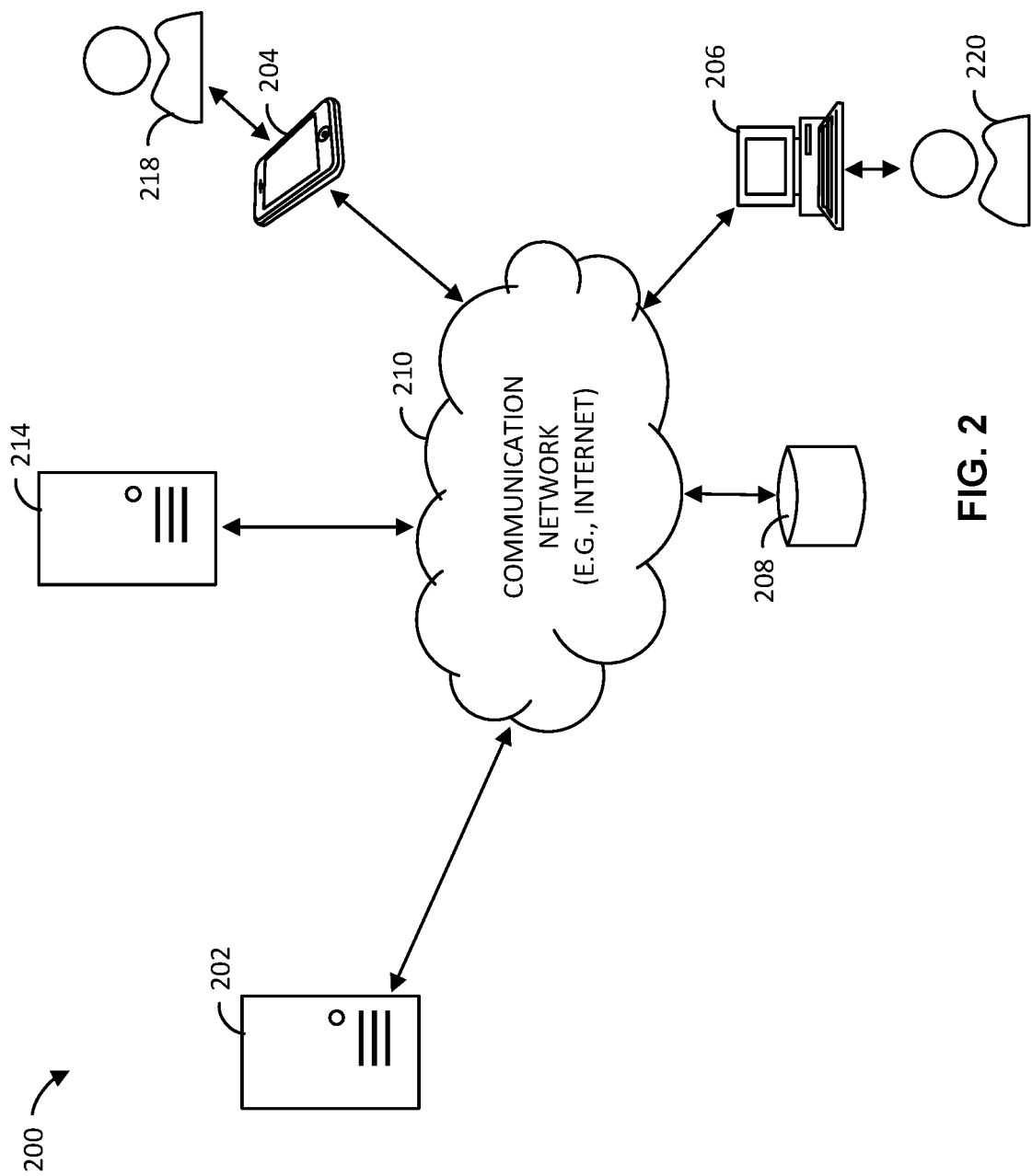
FIG. 2 is a block diagram showing an example conversational transaction system of the present disclosure in accordance with some embodiments.

Turning to the drawings, FIG. 2 illustrates a block diagram of an example conversational transaction system 200 that includes a compression computing device 202 (e.g., a server, such as an application server), a marketplace computing device 214 (e.g., a web server), a database 208, and multiple user computing devices 204, 206 operatively coupled over network 210. Compression computing device 202, marketplace computing device 214, and multiple user computing devices 204, 206 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 210.

In some examples, compression computing device 202 can be a computer, a workstation, a laptop, a server such as a cloud-based server, or any other suitable device. In some examples, each of the multiple user computing devices 204, 206 can be a cellular phone, a smart phone, a tablet, a personal assistant device, a voice assistant device, a digital assistant, a laptop, a computer, or any other suitable device. In some examples, compression computing device 202 and the marketplace computing device 214 can be operated and/or controlled by a retailer, and multiple user computing devices 204, 206 are operated by users or customers.

The marketplace computing device 214 can be distributed among one or more workstations or servers that are coupled together over the network 210. The marketplace computing device 214 can cause an ecommerce marketplace to be displayed or otherwise communicated via one or more websites, mobile apps or other suitable tool. The users 218, 220 can view, browse and order items that may be made available via the ecommerce marketplace as well as enter searches for product or items. The marketplace computing device 214 can collect information such as product title data by the compression computing device 202. The marketplace computing device 214 can store such information and/or send such information for storage in the database 208 or in other components of the conversational transaction system 200.

Compression computing device 202 can also be operable to communicate with database 208 over the communication network 210. The database 208 can be a remote storage device, such as a cloud-based server, a memory device on another application server, a networked computer, or any other suitable remote storage. Although shown remote to compression computing device 202, in some examples, database 208 can be a local storage device, such as a hard drive, a non-volatile memory, or a USB stick.

Communication network 210 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 210 can provide access to, for example, the Internet.

The user computing devices 204, 206 may communicate with the marketplace computing device 214 over communication network 210. For example, the marketplace computing device 214 may host one or more ecommerce marketplaces on one or more websites. Each of the user computing devices 204, 206 may be operable to view, access and interact with the websites hosted by the marketplace computing device 214. Such interactions or transactions can be performed using conversation or via voice of the users. In some examples, the marketplace computing device 214 can allow a user 218, 220, via the user computing devices 204, 206, to browse, search and/or select products for purchase using voice commands or other voice inputs. The marketplace computing device 214 can respond to the users' voice commands with oral responses. As will be further explained, the marketplace computing device 214 can also use the compressed titles that can be generated by the compression computing device 202 during conversational transactions on the ecommerce marketplace.

Figure 3:
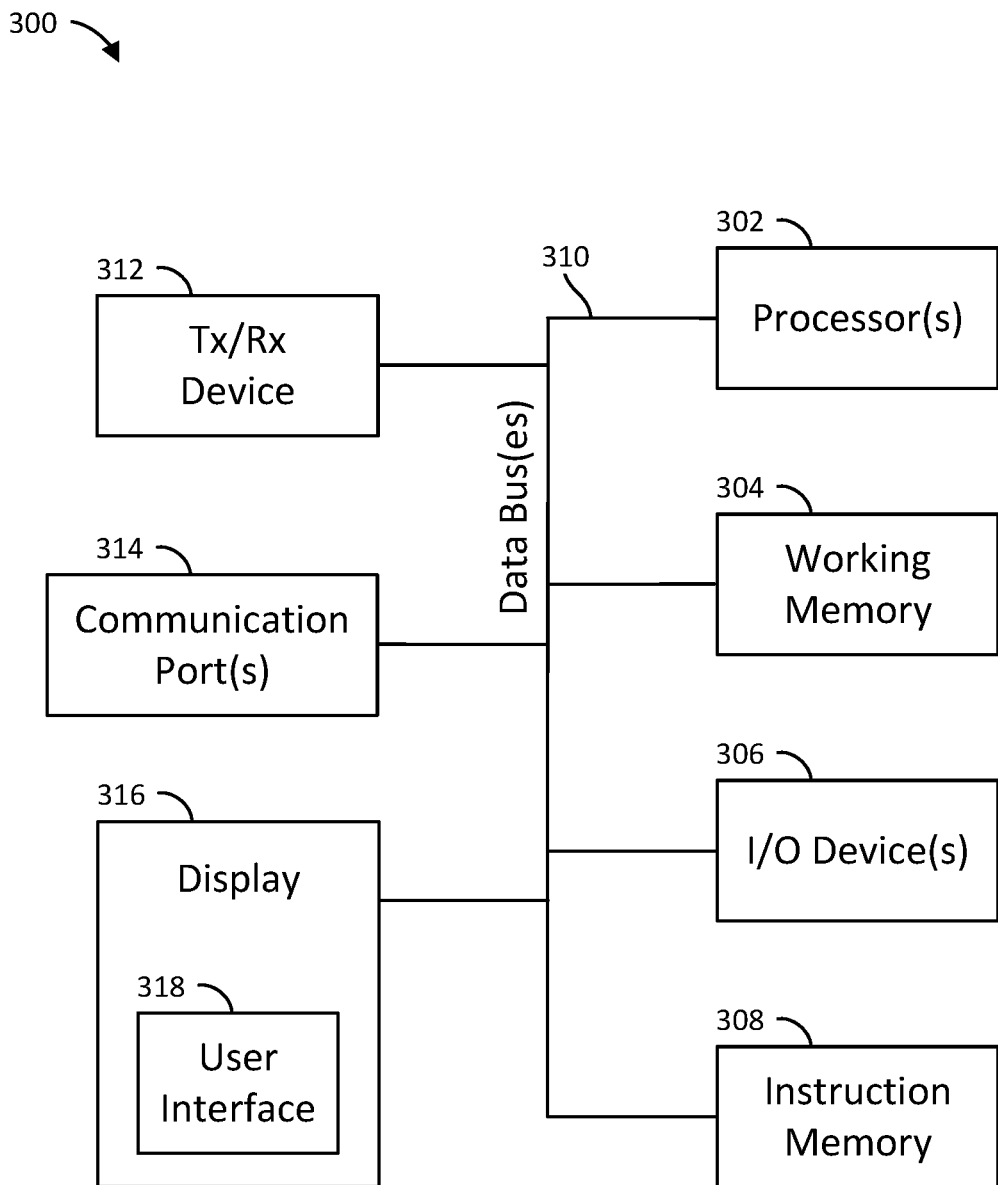
FIG. 3 is a block diagram of a computing device of the system of FIG. 2 in accordance with some embodiments.

FIG. 3 illustrates an example computing device 300. The compression computing device 202, the marketplace computing device 214 and/or the user computing devices 204, 206 may include the features shown in FIG. 2. For the sake of brevity, FIG. 2 is described relative to the compression computing device 202. It should be appreciated, however, that the elements described can be included, as applicable, in the marketplace computing device 214, and/or the user computing devices 204, 206.

As shown, the compression computing device 202 can be a computing device 300 that may include one or more processors 302, working memory 304, one or more input/output devices 306, instruction memory 308, a transceiver 312, one or more communication ports 314, and a display 316, all operatively coupled to one or more data buses 310. Data buses 310 allow for communication among the various devices. Data buses 310 can include wired, or wireless, communication channels.

Processors 302 can include one or more distinct processors, each having one or more cores. Each of the distinct processors can have the same or different structure. Processors 302 can include one or more central processing units (CPUs), one or more graphics processing units (GPUs), application specific integrated circuits (ASICs), digital signal processors (DSPs), and the like.

Processors 302 can be configured to perform a certain function or operation by executing code, stored on instruction memory 308, embodying the function or operation. For example, processors 302 can be configured to perform one or more of any function, method, or operation disclosed herein.

Instruction memory 308 can store instructions that can be accessed (e.g., read) and executed by processors 302. For example, instruction memory 308 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 302 can store data to, and read data from, working memory 304. For example, processors 302 can store a working set of instructions to working memory 304, such as instructions loaded from instruction memory 308. Processors 302 can also use working memory 304 to store dynamic data created during the operation of the compression computing device 202. Working memory 304 can be a random access memory (RAM) such as a static random access memory (SRAM) or dynamic random access memory (DRAM), or any other suitable memory.

Input-output devices 306 can include any suitable device that allows for data input or output. For example, input-output devices 306 can include one or more of a keyboard, a touchpad, a mouse, a stylus, a touchscreen, a physical button, a speaker, a microphone, or any other suitable input or output device.

Communication port(s) 314 can include, for example, a serial port such as a universal asynchronous receiver/transmitter (UART) connection, a Universal Serial Bus (USB) connection, or any other suitable communication port or connection. In some examples, communication port(s) 314 allows for the programming of executable instructions in instruction memory 308. In some examples, communication port(s) 314 allow for the transfer (e.g., uploading or downloading) of data, such as product catalog data, compressed title data and the like.

Display 316 can display a user interface 318. User interfaces 318 can enable user interaction with the compression computing device 202. For example, user interface 318 can be a user interface that allows an operator to interact, communicate, control and/or modify different features or parameters of the compression computing device 202. The user interface 318 can, for example, display the performance of the compression computing device 202 and/or the compressed titles generated by the compression computing device 202 using different textual, graphical or other types of graphs, tables or the like. In some examples, an operator can interact with user interface 318 by engaging input-output devices 306. In some examples, display 316 can be a touchscreen, where user interface 318 is displayed on the touchscreen.

Transceiver 312 allows for communication with a network, such as the communication network 210 of FIG. 1. For example, if communication network 210 of FIG. 2 is a cellular network, transceiver 312 is configured to allow communications with the cellular network. In some examples, transceiver 312 is selected based on the type of communication network 210 compression computing device 202 will be operating in. Processor(s) 302 is operable to receive data from, or send data to, a network, such as communication network 210 of FIG. 2, via transceiver 212.

Figure 4:
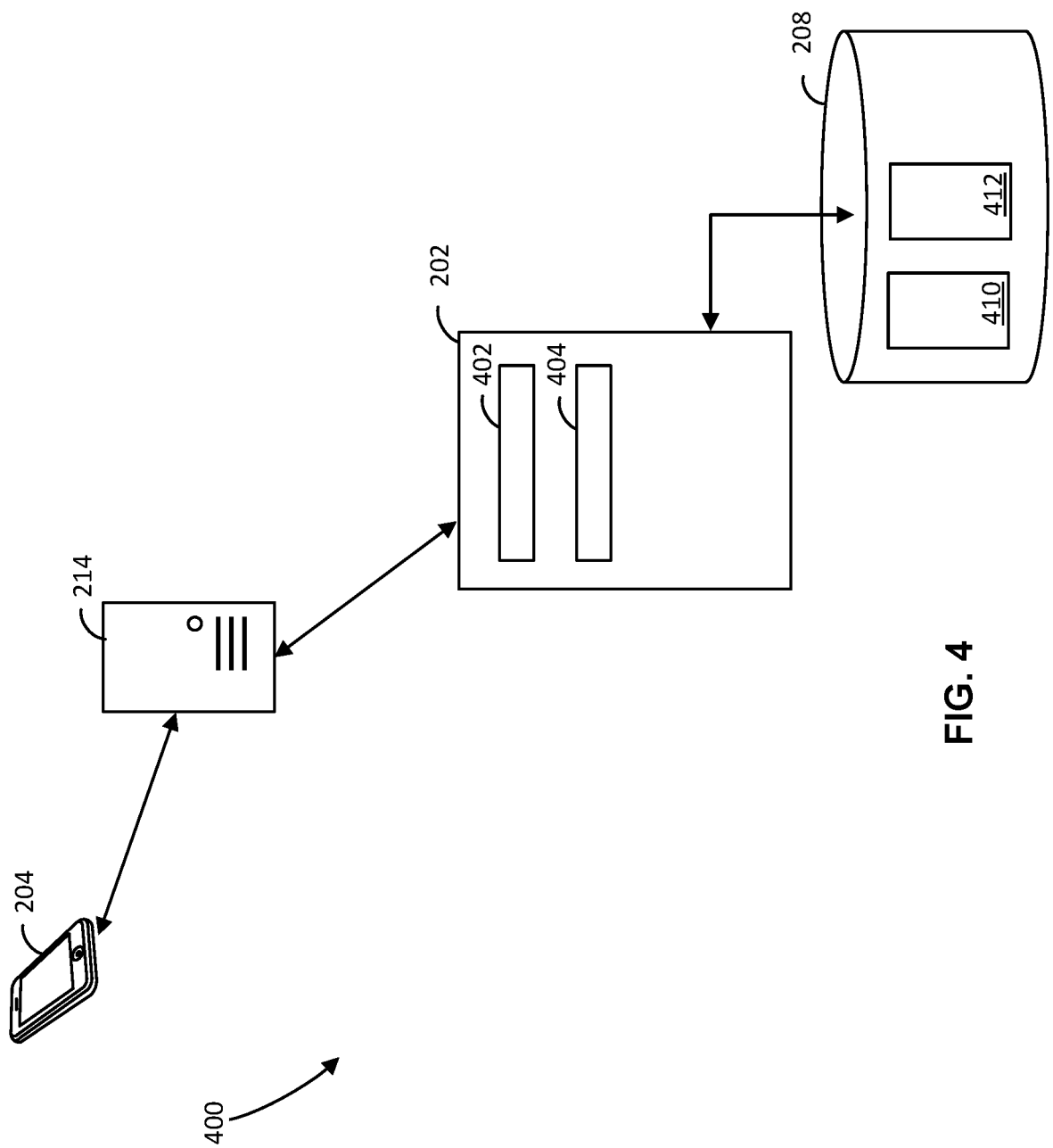
FIG. 4 is a block diagram showing an example compression computing device of the retrieval system of FIG. 2.

Turning now to FIG. 4, an example conversational transaction system 400 is shown. The conversational transaction system 400, in this example, includes compression computing device 202, marketplace computing device 214, and database 208. The compression computing device 202 can be coupled to the marketplace computing device 214, and the database 208 using any suitable wired or wireless connection such as by network 210 previously described. The user computing device 204 can also be coupled to the marketplace computing device 214 and/or to the compression computing device 202.

The compression computing device 202 can include a data acquisition engine 402 and a title compression model 404. The data acquisition engine 402 can obtain data and other information from various sources that may be used by one or more elements of the compression computing device 202. For example, the data acquisition engine 402 can obtain product title data or other information that may be available in the marketplace computing device 214 and/or in the database 208. The data acquisition engine 402 can use any suitable method to obtain the data or other information such as by using suitable application protocol interfaces (APIs) or the like.

The data acquisition engine 402 can obtain, for example, product title data 410 that can be stored in the database 208. The product title data 410 can characterize or include titles of each of the products that may be offered for sale on the ecommerce marketplace. The product title data can include a lengthy or detailed product titles also known as descriptive product titles. The descriptive product titles can be the full complete product descriptions from a catalog of products available on the ecommerce marketplace. It is the goal of the methods and apparatuses of the present disclosure to automatically determine compressed product titles based on the descriptive product titles. A descriptive product title can be determined to be too lengthy for use in conversational transactions if the descriptive product title include 5 words or more. In other circumstances, it can be desirable to compress product titles having less than 5 words. The data acquisition engine 402 can also obtain human-generated compressed product titles 412. The human-generated compressed product titles 412 can be used, for example, to fine-tune or otherwise train the title compression model 404.

The title compression model 404 can be a suitable trained machine learning model that can automatically determine a compressed product title from a descriptive product title without the need for human intervention. In one example, the title compression model 404 can be a convolutional neural network with one or more layers. In one example, the title compression model 404 can be created with at least three layers. The title compression model 404 can include, for example, an embedding layer, an encoder layer and a classification layer.

Figure 5:
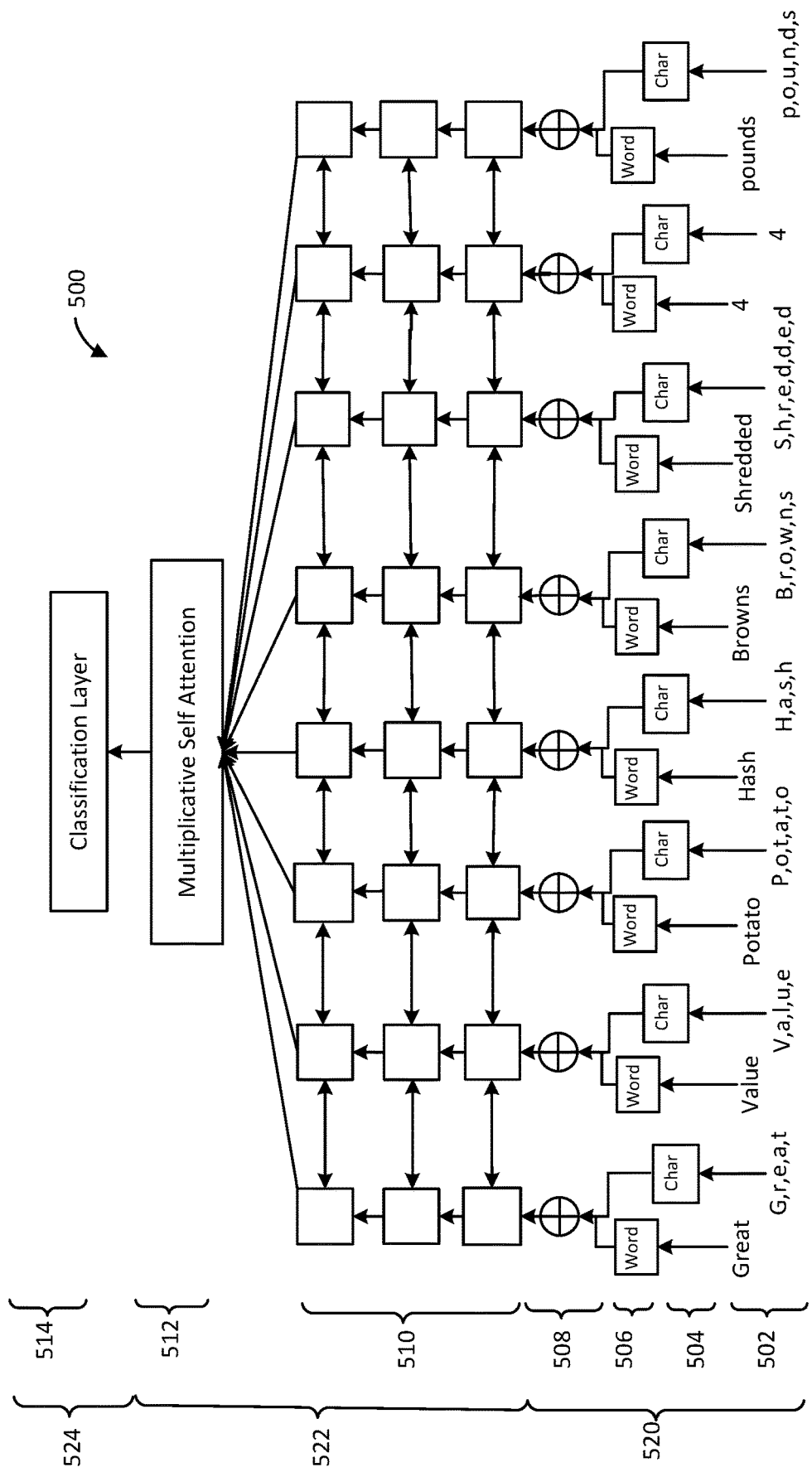
FIG. 5 is a block diagram showing an example architecture of a title compression model of the present disclosure in accordance with some embodiments.

The title compression model 404 can have a model architecture 500 as shown in FIG. 5. In this example, the model architecture 500 includes an embedding layer 520, an encoder layer 522 and a classification layer 524. The encoder layer 522, in the example shown, addresses a problem that can arise in applying pre-trained embeddings to a specific domain such as vocabulary mismatch. In domains such as retail domains, product titles can include private labels, brand names, packaging descriptors and the like that can be treated as unknown words. To address this problem, a combination of fixed pre-trained word embeddings and randomly initialized, trainable, character level embeddings can be used. In the example shown, the architecture 500 of the title compression model can use two inputs that include (1) a vector containing indices of words in the input product title, $x_w \in \mathbb{Z}^N$; and (2) a vector containing indices of the characters in each word of the product title, $x_c \in \mathbb{Z}^{N \times C}$, where N is the maximum sequence length and C is the maximum word length. Character level convolutions on $x_c$ can be used to combine and project the character level embeddings for each word onto $\mathbb{R}^{e_{char}}$. The two embeddings can then be combined using a high network to obtain a final embedding $x_{emb}$, as characterized by equations (1), (2), and (3) below.

$$x_{wemb}{}^i = \text{word-embedding}(x_w{}^i), \in \mathbb{R}^{e_{word}} \quad (1)$$

$$x_{cemb}{}^i = \text{CharCNN}(x_c{}^i), \in \mathbb{R}^{e_{char}} \quad (2)$$

$$x_{emb}{}^i = \text{highway}([x_{cemb}{}^i; x_{wemb}{}^i]), \in \mathbb{R}^{e_{char}+e_{word}} \quad (3)$$

For example, and as shown in FIG. 2, the embedding layer 520 can use as inputs the character level embedding 504 and the word level embedding 506 that can be based on the descriptive product title 502. The descriptive product title 502 or the long or uncompressed product title can be obtained from the catalog of products available on the ecommerce marketplace. As shown in this example, the incoming descriptive product title 502 is Great Value Potato Hash Browns Shredded 4 pounds. The character level embedding 504 can include a vector that is created from the characters in each word of the product title as shown. The word level embedding 506 can include each word from the product title. These two embeddings 504 and 506 can be used as inputs to the embedding layer 520 and can be combined using the highway network 508 to obtain the final embedding $x_{emb}$ as described above.

The architecture 500 of the title compression model in the example shown can also include the encoder layer 522. The encoder layer 522 can use three stacked layers of bidirectional long short-term memory layers (BiLSTM) 510 and a multiplicative self attention layer 512. The BiLSTM layers 510 can be obtain contextualized representation $x_b{}^i \in \mathbb{R}^{2h}$ for the $i_{th}$ sequence element as the concatenation of the hidden states, each of dimension h, from the forward and backward passes of the LSTM units in the 3rd layer of layer 510, as characterized in equation (4) below.

$$x_b{}^i = [h_f{}^{(i)[3]}; h_b{}^{(i)[3]}], i \in \{1, 2, \ldots N\} \quad (4)$$

The contextualized representation $x_b{}^i$ of each sequence element can be augmented by using the multiplicative self attention layer 512 to jointly attend to all other sequence elements without having to go through any gating mechanism. The final encoding $x_{enc}{}^i$ can be obtained for each sequence element according to equations (5), (6), and (7) in the encoding layer 522.

$$e_{ij} = x_b{}^{i^T} W_s x_b{}^j, e_{ij} \in \mathbb{R} \quad (5)$$

$$\alpha_{ij} = \frac{\exp(e_{ij})}{\sum_{k=1}^N \exp(e_{ik})} \quad (6)$$

$$x_{enc}^i = \sum_{j=1}^N \alpha_{ij} x_b^j \quad (7)$$

In the classification layer 514 of the architecture 500 of the title compression model 404, the contextualized embeddings can be used to determine a probability distribution that can then be used to train the model using a loss function. In the classification layer 514, the contextualized embeddings for each sequence element from the encoder layer 522 can be projected to $\mathbb{R}^2$ using a point-wise fully connected layer, parameterized by the weight matrix $W_c \in \mathbb{R}^{2h \times 2}$ and the bias $b_c \in \mathbb{R}^2$, which when operated upon by a softmax operator yields $y_i$, the probability distribution across the output class labels for the $i_{th}$ sequence element according to equation (8) below, $$y_i = \text{softmax}(W_c^T x_{enc}{}^i + b_c), i \in \{1, 2, \ldots N\} \quad (8)$$

The title compression model 404 that can have an architecture such as architecture 500 can be trained using a loss function such as a weighted binary cross entropy loss function $L(\Theta)$ according to equation (9) shown below, where N is the sequence length, $y_i$ is the probability that the $i_{th}$ sequence element belongs to class 1, is the ground truth label, $\alpha$ is the weight for the class 0, and $\beta = 1 - \alpha$, is the weight for class 1. In this example, $\alpha = 0.1$ and hence $\beta = 0.9$ since roughly 9/10 of the token labels are 0.

$$L(\theta) = -\frac{1}{N} \sum_i^N \alpha \cdot \hat{y}_i \log(y_i) + \beta \cdot (1 - \hat{y}_i) \log(1 - y_i) \quad (9)$$

The architecture 500 is an improvement over existing models and existing methods and apparatuses. In one aspect, the architecture 500 is an improvement because the hybrid architecture 500 described above uses both word level embeddings and character level embeddings as inputs to the model to address vocabulary mismatch problems of existing models and methods. In another aspect, the architecture 500 is an improvement over existing methods because the encoder layer 522 uses an encoder-only architecture and not an encoder-decoder architecture. In still another aspect, the architecture 500 is an improvement over existing models and methods because the encoder layer 522 uses multiple BiLSTM layers rather than LSTM layers as may be used in existing methods. Still further, the architecture 500 is an improvement over existing methods because the encoder layer 522 includes the self-attention layer 512 to provide global context.

Figure 6:
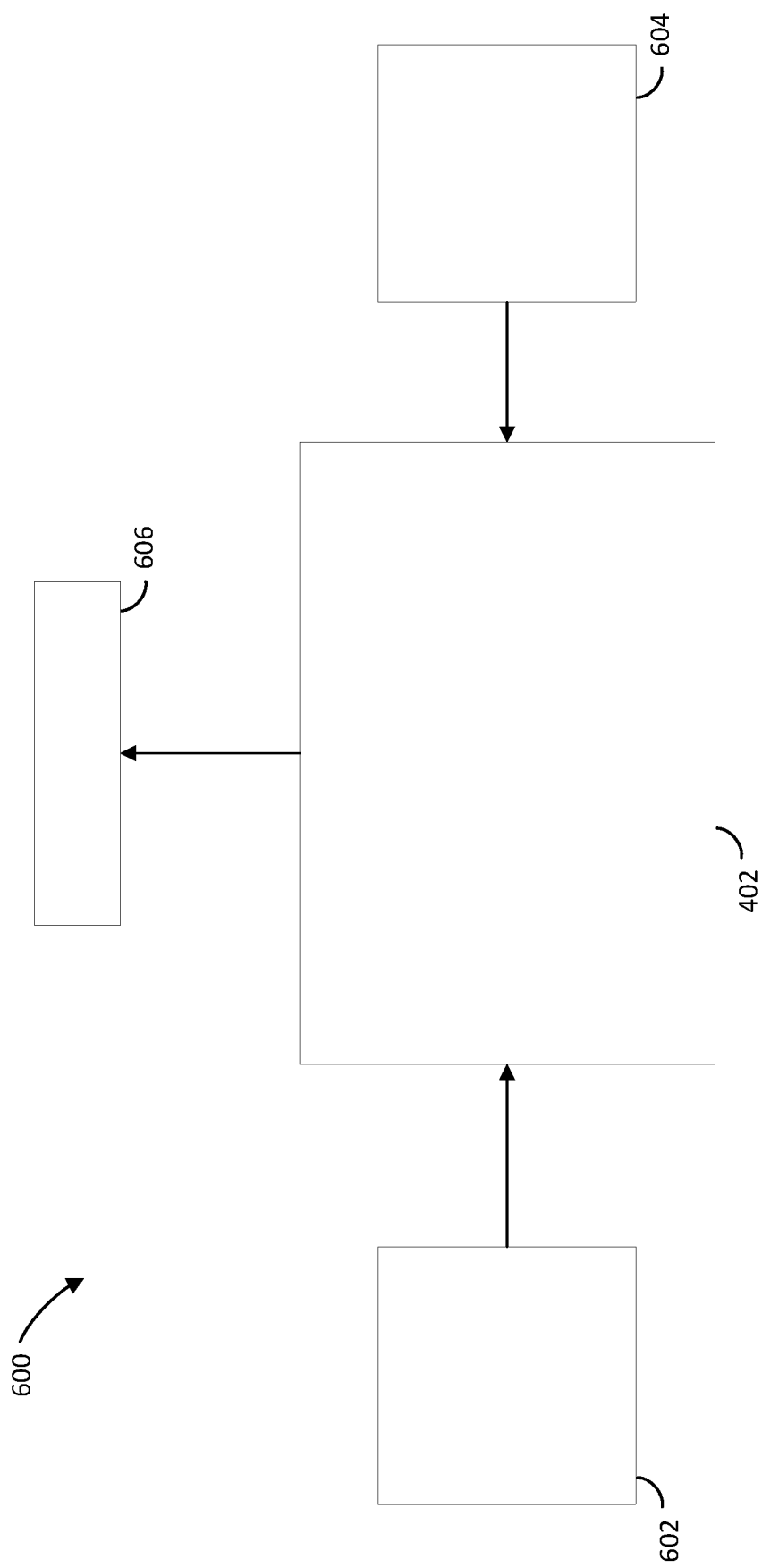
FIG. 6 is a block diagram showing an example title compression model that includes pre-training and fine tuning in accordance with some embodiments of the present disclosure.

The title compression model 404 can be trained by performing pre-training and fine tuning and then the model can be implemented to determine compressed product titles. As shown in FIG. 6, the title compression model 404 can be trained by a pre-training step 602 that can use as inputs descriptive product titles from a product catalog of ecommerce marketplace. The title compression model 404 can also be trained by a fine tuning step 604 that can use descriptive product titles and corresponding sample compressed product titles. Once trained, the title compression model 404 can operate to determine compressed product titles for each of the products available on the ecommerce marketplace based on the descriptive product titles.

The pre-training step of training the title compression model 404 can use a replaced-token detection task. In such a pre-training step, the long, uncompressed or descriptive product titles from a catalog of products can be used. The descriptive product titles (after suitable data conversion, normalization and other data preparation steps) can be corrupted by randomly selecting a fraction f of the tokens (e.g., words) in the descriptive product title and replacing the selected tokens with another token. Any suitable fraction f can be used. Experimental results suggest that about f=0.15 results in satisfactory results. In other examples and based on the size of the available training dataset, other fractions f can be used. In another example, a fraction f of 0.25 can be used.

To ensure that the neural network of the title compression model 404 gets a chance to make predictions for all positions in a descriptive product title, the token replacement process can be repeated multiple times for the same descriptive product titles until token replacement process covers all the tokens in each descriptive product title. This process results in multiple copies of the same descriptive product title in the dataset with tokens replaced in mutually disjoint positions. A binary sequence label can be generated for each corrupted line that can label the replaced position with a 1 and all other positions can be labelled with a 0. In addition to including the corrupted descriptive product titles in the dataset, the uncorrupted descriptive product titles are also included so as to not bias the title compression model 404 into predicting at least one corrupted label in each input. The title compression model 404 can then be trained to predict which token in the descriptive product title is the corrupted (or replaced token). This training can be performed using the weighted binary cross entropy loss function (Equation (9)) described above.

As can be appreciated, it can be more difficult for the title compression model 404 to predict which token in the descriptive product title has been replaced when the quality of the replacement token is higher. That is, when the replaced token is used in other product titles next to or near to the replacement position it can be more difficult for the title compression model 404 to predict the replaced token. When the replaced token is more difficult to predict, the latent representations that the title compression model 404 learns are better and result in a better trained model that can determine more accurate and more satisfactory compressed product titles.

In order to improve the quality of the replacement tokens, a skip gram model can be used. In such a method, the log likelihood is maximized in a window centered on the token to be replaced. The replacement token can then be selected form the window. This improves computing efficiency and obtains a reasonably good replacement token. If $w_i$ is the token at the $i_{th}$ position that is to be replaced, the chosen replacement token is $w_r$ as characterized by Equation (10) below, where V is the vocabulary, $V'=V-\{w_i+k;\ -n\leq k\leq +n\}$, $l_w=2n+1$ is the window size, and $P_s(w_i|w_j;l_w)$ is the conditional distribution for occurrence of $w_i$ in a window of length $l_w$ centered on $w_j$.

$$w_r = \underset{w \in V'}{\operatorname{argmin}} \sum_{k=-n}^{n} -\log P_s(w \mid w_{i+k}; l_w) \tag{10}$$

In other examples, other suitable methods can be used to determine the replacement token such as using a language model trained jointly with the title compression model 404.

The training of the title compression model can then include the fine tuning step. In such a step, the model can be trained using a dataset that includes a sample of descriptive product titles and corresponding sample compressed product titles. The compressed product titles can be human generated for example. The fine tuning can be performed using the word level embeddings and the character level embedding previously described. As will be further described below, the fine tuning of the title compression model 404 can be performed in a low resource setting such the training dataset and the processing resources that are required to train the title compression model 404 are much lower than would otherwise be required using existing methods and apparatuses and can determine compressed product titles of equal, similar or superior quality of existing methods and apparatuses.

The methods and apparatuses described herein were tested using a sample dataset. The dataset included descriptive product titles (i.e., long product titles) and human generated compressed product titles for 40,445 top selling products from an ecommerce marketplace. The human generated compressed product titles were generated by providing the descriptive product titles to human actors that were asked to generate compressed product titles (of no more than four words) by choosing words to retain from the descriptive product titles. An additional unlabeled dataset was used that included 256,298 descriptive product titles from the catalog of items available on the ecommerce marketplace.

The datasets were prepared with some normalization. The normalization of the datasets included converting all characters of the product titles in the datasets to lower characters and removing consecutive white space characters. In addition all "&" characters were converted to the word "and" and padding commas with whitespaces to that the commas were treated as additional characters rather than being combined with and adjacent word in the title. The datasets were then tokenized in which each product title is split into separate tokens as indicated by white space between tokens. In addition, the tokenized product titles were truncated. The maximum sequence length was limited to 35 tokens. Product titles in excess of 35 tokens were truncated. The maximum token length was limited to 15 characters. Tokens in excess of 15 characters were truncated. The word and character vocabularies were extracted from the product title dataset. This test example dataset showed a vocabulary size of 67,634 words and 69 characters. From this normalized dataset, 20% of the human generated compressed title dataset was set aside as the test set, 8% was used as a validation set and the remaining 72% was used as the training set.

An ablation study was conducted and a study to compare the title compression model 404 against other existing title compression models. In the ablation study, several iterations were trained and then and implemented to determine their relative performance against the human generated compressed title data set that was set aside from the dataset described above. For purposes of the present disclosure, acronyms or abbreviated names are used to describe the tested variations of the title compression model. The following variations of the title compression model 404 were tested and are described below. Generally speaking, the first letter from each layer (or from the descriptive variation) is used to describe the model.

CB3SA=model includes CharCNN layer, 3 BiLSTM layers, self attention layer, classification layer, trained without pretraining CB3SA+PT=model includes CharCNN layer, 3 BiLSTM layers, self attention layer, classification layer, trained with pretraining CB3SA-CharCNN=model includes no CharCNN layer, 3 BiLSTM layers, self attention layer, classification layer, trained without pretraining CB3SA-BLSTM1=model includes no CharCNN layer, 2 BiLSTM layers, self attention layer, classification layer, trained without pretraining CB3SA-SA=model includes CharCNN layer, 3 BiLSTM layers, no self attention layer, classification layer, trained without pretraining CB3SA-SA+NWSA7=model includes CharCNN layer, 3 BiLSTM layers, no self attention layer but includes a narrow width attention with window length of 7, classification layer, trained without pretraining CB3SA-SA+MHSA8=model includes CharCNN layer, 3 BiLSTM layers, no self attention layer but includes a multi-headed self attention layer with 8 attention heads, classification layer, trained without pretraining These variation iterations of the title compression model 404 were trained and then tested on the test dataset that was set aside from the dataset described above. Various performance measures were used to evaluate the performance of the variations of the model. For example, an F1 score was determined and an exact match (EM) score was determined. The F1 score that was used to evaluate the models was a ROUGE-1 F1 score. The EM score refers to the percentage of outputs that exactly match the human generated compressed titles. The variations described above performed as shown in Table 1 below.

TABLE 1

Model Peformance

| Model | F1 | EM |
| --- | --- | --- |
| CB3SA | 0.8465 | 62.24 |
| CB3SA + PT | 0.8558 | 63.83 |
| CB3SA-CharCNN | 0.8414 | 60.13 |
| CB3SA-BLSTM1 | 0.8455 | 62.37 |
| CB3SA-SA | 0.8417 | 60.22 |
| CB3SA-SA + NWSA7 | 0.8458 | 62.39 |
| CB3SA-SA + MHSA8 | 0.8420 | 59.72 |

As shown in Table 1, the model with pretraining (CB3SA+PT) performed thte highest performance among the model variations tested. Also, the removal of the CharCNN layer causes the most significant drop in performance. Other observations include that removing a BiLSTM layer (CB3SA-BLSTM1) caused one of the least negative drops in performance. Also, removing the self-attention layer and adding a multi-headed self-attention layer with 8 attention heads (CB3SA-SA+MHSA8) showed a negative impact that is similar to removing the self-attention layer altogether (CB3SA-SA). Also, using a narrow width attention with window length of 7 instead of the regular self-attention layer (CB3SA-SA+NWSA7) caused the least drop in performance over the pre-trained model (CB3SA+PT). The above observations were made using F1 score.

Next, the performance of the pre-trained model of the present disclosure (CB3SA+PT) was compared against other existing models. The performance of the pre-trained model was compared against a XLNet model, a BERT model, a RoBERTa model, a DistillBERT model, and an ELECTRA model that were all trained on the same dataset. These existing models are much more expensive to implement because of the resources that are needed to train the models and because the size of the models. These other existing models include many more parameters than the models of the present disclosure. In some cases, these existing models have 55 times more parameters than the models of the present disclosure. Yet, the models of the present disclosure show similar or superior performance. The performance of the pre-trained model (CB3SA+PT) against these existing models is shown below in Table 2. In addition, Table 2 shows the number of parameters (Params) used by the existing models.

TABLE 2

Performance Comparison

| Model | Params | F1 | EM |
| --- | --- | --- | --- |
| CB3SA + PT | 2M | 0.8558 | 63.83 |
| XLNet | 110M (55X) | 0.8582 (−0.28%) | 74.25 |
| BERT-Base | 110M (55X) | 0.8803 (−2.78%) | 69.17 |
| RoBERTa | 125M (62X) | 0.7644 (+11.96%) | 58.17 |
| ELECTRA | 14M (7X) | 0.8689 (−1.50%) | 66.48 |
| Distill BERT | 66M (33X) | 0.8707 (−1.71%) | 67.18 |

As can be seen, the models of the present disclosure can provide a similar performance to much larger models that require significantly more resources and are more costly to implement.

Figure 7:
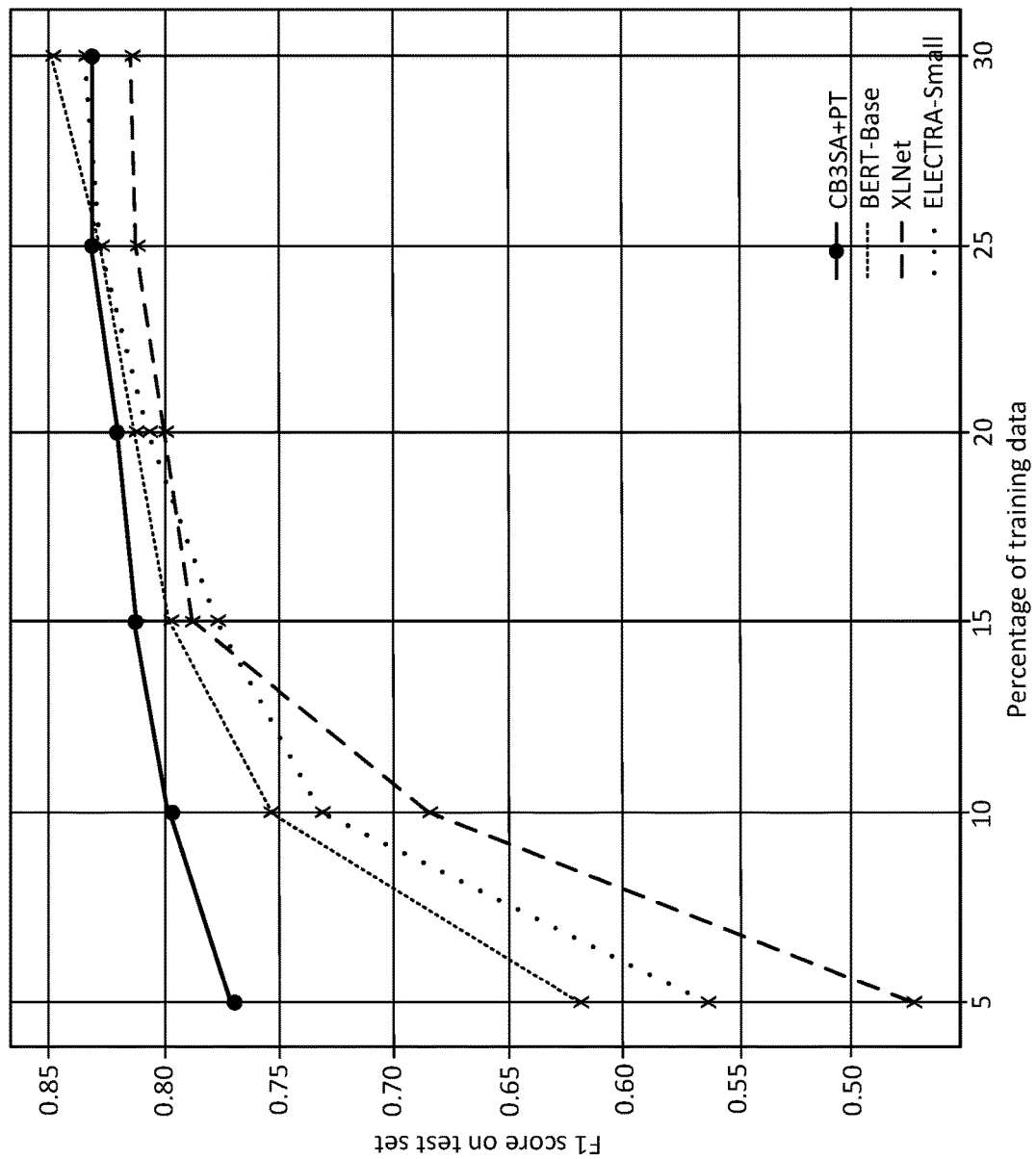
FIG. 7 is line graph showing a performance of an example title compression model of the present disclosure as compared to existing models.

The models of the present disclosure were also testing in various low resource settings. For example, the models of the present disclosure were tested by using a fraction of the datasets previously described. Rather than training the models (both the models of the present disclosure and existing models) on 5%, 10%, 15%, 20%, 25% and 30% of the data set. As shown in FIG. 7, the performance of the pre-trained model of the present disclosure (CB3SA+PT) performed better than existing models in most low-resource settings and performed similarly in even the 30% circumstance. As can be seen, the models of the present disclosure can be used in a low resource setting with improved results over existing models.

In addition, the models of the present disclosure can be trained and implemented using lower processing requirements than are required to train and implement existing models. In some examples, the models of the present disclosure can be trained on a single graphics processing unit (GPU) and can be trained in period of time of one hour or less. This is a significant reduction over the processing requirements and the length of time required to train existing models. For example, the models of the present disclosure (including in the experimental results described above) were trained on a single Nvidia V100 graphics processing unit (GPU) for 15 epochs, or 1 hour, or until convergence. Convergence was measured as 3 consecutive epochs without any improvements in performance measurements made using the validation dataset.

Figure 8:
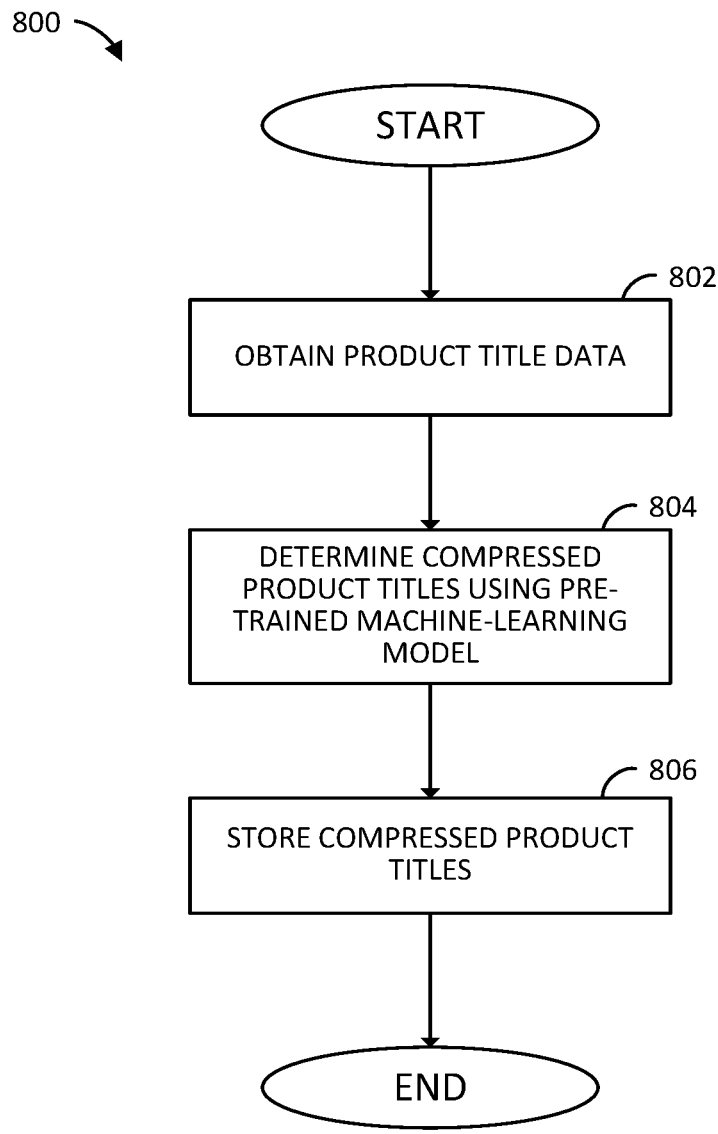
FIG. 8 is a flowchart showing an example method of determining compressed product titles in accordance with some embodiments of the present disclosure.

Referring now to FIG. 8, an exemplary method 800 of determining compressed product titles is shown. The method 800 can be performed, for example, by the conversational transaction systems of the present disclosure. While the various steps can be performed by the conversational transaction system 200, 400 and/or by other systems, the method 800 is described in the context of the conversational transaction system 400 for brevity.

At step 802, the compression computing device 202 can obtain product title data. The compression computing device 202 can obtain the product title data using data acquisition engine 402, for example. The product title data can include descriptive product titles for example. Such descriptive product titles can be long product titles that need to be shortened into compressed product titles so that the compressed product titles can be used during conversational transactions on an ecommerce marketplace. The product title data can be obtained from a database, such as database 208, or can be obtained from the marketplace computing device 214. In other examples, the product title data can be obtained from other sources of information regarding the catalog of products that may be available on the ecommerce marketplace.

At step 804, the compression computing device 202 can determine compressed product titles using a pre-trained machine learning model. The compressed product titles can be of suitable length to make conversational transactions more satisfactory for the customer. In some examples, the compressed product titles can have a length of four or less words. The compressed product titles can also be made of words that are retained from the original descriptive or long product title. The pre-trained machine learning model can be trained by including a pre-training step that uses a replaced-token detection task as previously described with respect to title compression model 404. As previously described a skip gram model can be used to determine the replacement tokens for use in the replaced-token detection task.

For the sake of brevity, the details of the pre-trained machine learning model that can be used at step 804 is not repeated here but the pre-trained machine learning model can be the title compression model 404 previously described. As such, the pre-trained machine learning model can include an embedding layer that can use as inputs first vectors containing indices of words in a product title and second vectors containing indices of characters in each word of the product title. The pre-trained machine learning model can also include an encoder layer and a classification layer as previously described. The pre-trained machine learning model can include a character-level convolutional neural network layer, a bidirectional long short-term memory layer and a self attention layer. In other examples, other pre-trained machine learning models can be used.

At step 806, the compressed product titles that are determined at step 804 can be stored. The compressed product titles can be stored in database 208, for example. The compressed product titles can be stored so that the compressed product titles can be accessed or otherwise retrieved by other elements or computing devices for use during conversational transactions. The compressed product titles, for example. can be retrieved by the marketplace computing device 214 and used when the marketplace computing device 214 interacts with a user 218 using a user computing device 204.

Figure 9:
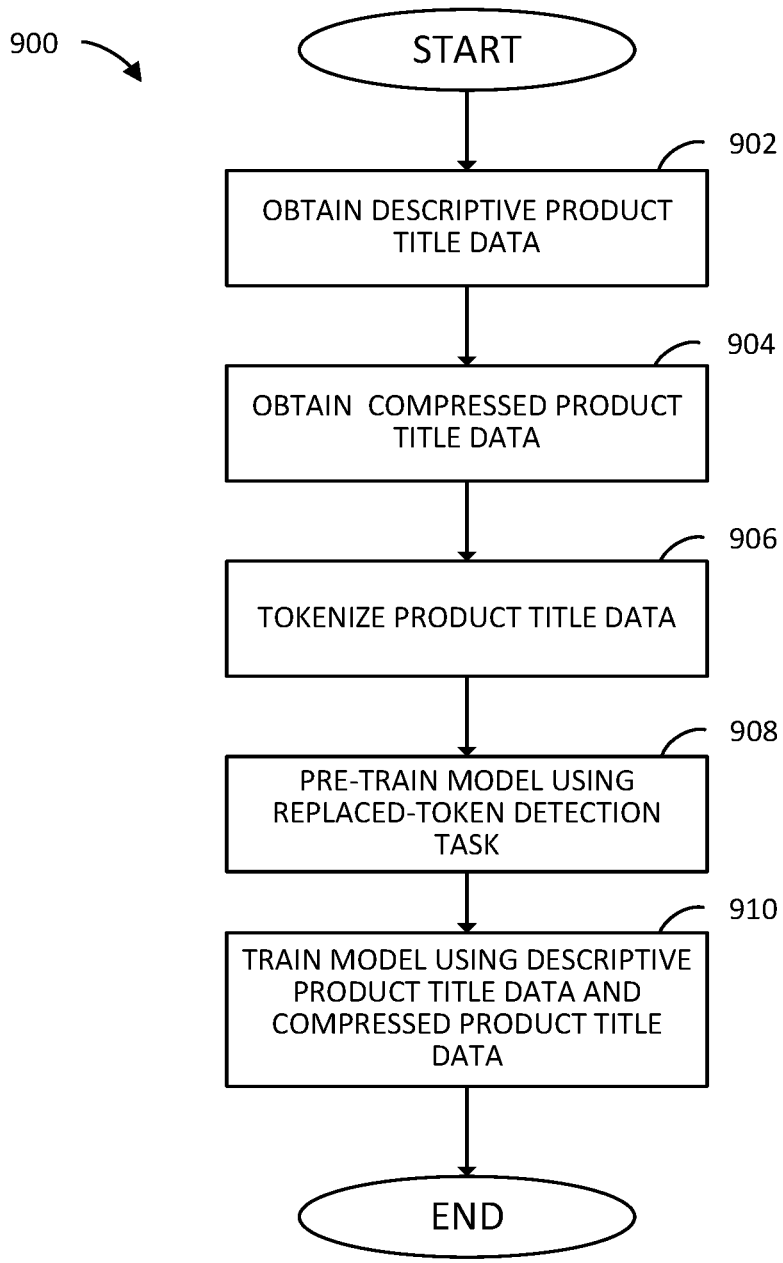
FIG. 9 is a flow chart illustrating an example method of training a title compression model in accordance with some embodiments of the present disclosure.

Referring now to FIG. 9, an exemplary method of training a machine learning model for determining compressed product titles is shown. The machine learning models trained using the training method 900 can include the models described in the present disclosure such as title compression model 404. At step 902, descriptive product title data can be obtained. The descriptive product title data can be long product title information that can be obtained from a catalog of items available on an ecommerce marketplace. The descriptive product title data can include titles that are too long to be used in conversational transactions and such be converted into compressed product titles that are made of words retained from the descriptive product titles. Any suitable method can be used to obtain the descriptive product title data such as obtaining the data from the database 208 or from the marketplace computing device 214 by the data acquisition engine 402.

At step 904, compressed product title data can be obtained. Such compressed product title data can be shortened titles of products that have been determined using a title compression method. For example, the compressed product title data can be human generated compressed product titles that have been generated using human actors. The compressed product title data can include compressed product titles that correspond to subset of the descriptive product titles in the descriptive product title data obtained at step 902.

At step 906, the product title data can be tokenized. The process of tokenizing the product data can be performed for descriptive product title data obtained at step 902. The tokenizing process can normalize and truncate the descriptive product title, for example. The tokenizing process can perform the operations previously described by setting predetermined sequence lengths and predetermined token lengths. In addition, unknown and/or missing tokens can be replaced with predetermined unknown or missing token labels.

At step 908, the machine learning model can be pre-trained using a replaced token detection task. While not shown, the machine learning model that is pre-trained can be built to have a suitable model architecture for the task of determining compressed product titles. For example, the machine learning model can be built to have an architecture such as model architecture 500 previously described. In other examples, the machine learning model can have other architectures or variations on the model architecture 500 that were described during the testing and experimentation that was performed and described above.

The pre-training step can include any suitable method of replacing tokens in the descriptive product titles and then training the machine learning model using the replaced token data. In one example, a skip gram model, as previously described, can be used to determine the replacement tokens to be used to replace the tokens when building the dataset for the pre-training.

At step 910, the machine learning model can be trained (or fine-tuned) using the descriptive product title data and compressed product title data. The training dataset used at step 910 can include descriptive product titles and corresponding compressed product titles. This step can fine tune the training of the machine learning model to improve the performance of the model.

After training, the trained machine learning model can be implemented and used to determine high quality compressed product titles. As discussed, the machine learning models and apparatuses of the present disclosure are improvements over existing methods by improving the quality of the compressed product titles and by allowing high quality compressed product titles to be determined with limited data and in low resource settings that can include lower processing requirements. These improvements can reduce costs and increase revenues for the operators of ecommerce marketplaces. The methods and apparatuses of the present disclosure can also improve customer satisfaction and reduce customer drop-off by improving the customer experience in conversational transactions.

The foregoing examples focused on descriptions of the principles and teachings of the present disclosure used in the context of a retailer and an ecommerce marketplace. As can be appreciated, the methods and apparatuses described herein can be applied in various contexts and in various industries. The method and apparatuses of the present disclosure can be used to provide search results in other contexts, other industries and in other environments such as in the financial services, health services and other industries as well.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   non-transitory memory storing instructions thereon; and
   processor configured to read the instructions to:
   obtain product title data characterizing descriptive product titles of products from a database;
   determine compressed product titles based on the product title data using a machine learning model, wherein the machine learning model is pre-trained using a replaced-token detection task including a skip gram model, and wherein the machine learning model includes an embedding layer configured to receive randomly initialized character level embedding inputs and pre-trained word embedding inputs, wherein the embedding layer includes a highway network configured to combine one of the pre-trained word embedding inputs and a corresponding set of the randomly initialized character level embeddings to generate a final embedding for each word in the descriptive product title; and
   store the compressed product titles in the database.

2. The system of claim 1, wherein the machine learning model is fine-tuned using a subset of the product title data and corresponding human-generated compressed product titles.

3. The system of claim 1, wherein the machine learning model comprises an encoder layer and a classification layer.

4. The system of claim 1, wherein the machine learning model is trained using a training dataset comprising first vectors containing indices of words in a product title and second vectors comprising indices of characters in each word of the product title.

5. The system of claim 1, wherein the skip gram model is used to determine replacement tokens for use in the replaced-token detection task.

6. The system of claim 1, wherein the machine learning model comprises a character-level convolutional neural network layer, a bidirectional long short-term memory layer and a self attention layer.

7. The system of claim 1, wherein the machine learning model comprises an encoder-only architecture.

8. A method comprising:
   obtaining product title data characterizing descriptive product titles of products from a database;
   determining compressed product titles based on the product title data using a machine learning model, wherein the machine learning model is pre-trained using a replaced-token detection task including a skip gram model, and wherein the machine learning model includes an embedding layer configured to receive randomly initialized character level embedding inputs and pre-trained word embedding inputs, wherein the embedding layer includes a highway network configured to combine one of the pre-trained word embedding inputs and a corresponding set of the randomly initialized character level embeddings to generate a final embedding for each word in the descriptive product title; and
   storing the compressed product titles.

9. The method of claim 8, wherein the machine learning model is fine-tuned using a subset of the product title data and corresponding human-generated compressed product titles.

10. The method of claim 8, wherein the machine learning model comprises an encoder layer and a classification layer.

11. The method of claim 8, wherein the machine learning model is trained using a training dataset comprising first vectors containing indices of words in a product title and second vectors comprising indices of characters in each word of the product title.

12. The method of claim 8, wherein the skip gram model is used to determine replacement tokens for use in the replaced-token detection task.

13. The method of claim 8, wherein the machine learning model comprises a character-level convolutional neural network layer, a bidirectional long short-term memory layer and a self attention layer.

14. The method of claim 8, wherein the machine learning model comprises an encoder-only architecture.

15. A non-transitory computer readable medium having instructions stored thereon, wherein the instructions, when executed by at least one processor, cause a device to perform operations comprising:
   obtaining product title data characterizing descriptive product titles of products from a database;
   determining compressed product titles based on the product title data using a machine learning model, wherein the machine learning model is pre-trained using a replaced-token detection task including a skip gram model, and wherein the machine learning model includes an embedding layer configured to receive randomly initialized character level embedding inputs and pre-trained word embedding inputs, wherein the embedding layer includes a highway network configured to combine one of the pre-trained word embedding inputs and a corresponding set of the randomly initialized character level embeddings to generate a final embedding for each word in the descriptive product title; and storing the compressed product titles.

16. The non-transitory computer readable medium of claim 15, wherein the machine learning model is fine-tuned using a subset of the product title data and corresponding human-generated compressed product titles.

17. The non-transitory computer readable medium of claim 15, wherein the machine learning model comprises, an encoder layer and a classification layer.

18. The non-transitory computer readable medium of claim 15, wherein the machine learning model is trained using a training dataset comprising first vectors containing indices of words in a product title and second vectors comprising indices of characters in each word of the product title.

19. The non-transitory computer readable medium of claim 15, wherein the skip gram model is used to determine replacement tokens for use in the replaced-token detection task.

20. The non-transitory computer readable medium of claim 15, wherein the machine learning model comprises a character-level convolutional neural network layer, a bidirectional long short-term memory layer and a self attention layer.

* * * * *